(12) United States Patent
Williams et al.

(10) Patent No.: US 7,968,024 B2
(45) Date of Patent: Jun. 28, 2011

(54) METHOD FOR FORMING MOLDING COMPOUNDS AND ARTICLES THEREFROM

(75) Inventors: Kelly Williams, South Lyon, MI (US); Cynthia Flanigan, Canton, MI (US); Ellen Lee, Ann Arbor, MI (US); Dan Houston, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1005 days.

(21) Appl. No.: 11/162,480

(22) Filed: Sep. 12, 2005

(65) Prior Publication Data

US 2007/0059505 A1 Mar. 15, 2007

(51) Int. Cl.
*B29C 31/00* (2006.01)
*D04H 1/00* (2006.01)

(52) U.S. Cl. .................................. 264/152; 428/292.1
(58) Field of Classification Search ................ 428/292.1
See application file for complete search history.

(56) References Cited

U.S. PATENT DOCUMENTS

| | | | |
|---|---|---|---|
| 5,037,690 A | 8/1991 | van der Kooy | 428/116 |
| 5,942,321 A | 8/1999 | Romesberg et al. | 428/300.7 |
| 6,464,908 B1 | 10/2002 | Friend et al. | 264/29.2 |
| 7,232,605 B2 * | 6/2007 | Burgueno et al. | 428/294.7 |
| 7,268,092 B2 * | 9/2007 | Gerard et al. | 442/394 |
| 7,357,888 B2 * | 4/2008 | Michael | 264/115 |
| 2003/0046772 A1 | 3/2003 | Halahmi et al. | 106/644 |
| 2003/0188667 A1 | 10/2003 | Beard et al. | 8/115.51 |
| 2004/0232274 A1 * | 11/2004 | Gardner | 242/609 |

OTHER PUBLICATIONS

G. Mehta et al., "Low Cost Bio-composite Sheet Molding Compound Panel: Processing and Property Evaluation" *GPEC 2004 Paper Abstract #38*, Michigan State University.
L.T. Drzal et al., "Biobased Structural Composite Materials for Housing and Infrastructure Applications: Opportunities and Challenges".

* cited by examiner

*Primary Examiner* — D. Lawrence Tarazano
*Assistant Examiner* — Camie S Thompson
(74) *Attorney, Agent, or Firm* — Damian Porcari; Brooks Kushman P.C.

(57) ABSTRACT

A method for forming a molding compound including simultaneously chopping a non-synthetic reinforcement member and a synthetic reinforcement member and forming a hybrid reinforcement member from the chopped non-synthetic and synthetic reinforcement members. The hybrid reinforcement member can be molded into a molding compound.

20 Claims, 3 Drawing Sheets

METHOD FOR FORMING MOLDING COMPOUNDS AND ARTICLES THEREFROM

BACKGROUND OF THE INVENTION

1. Field of the Invention

One aspect of the present invention relates to a method for forming molding compounds.

2. Background Art

In producing many articles, designers desire to find articles which may be substituted for existing articles. In certain cases, the substitute article should have the same or better strength characteristics as the original article and also be relatively lighter in weight and lower in cost. This relative reduction in weight may be accomplished, in part, by integrating parts or by using materials of lighter weight. Designs that integrate parts are often accomplished by molding operations. Molding operations use molding compounds that typically have relatively lighter weight than the materials they are replacing. However, articles made from molding compounds may have higher unit costs than the products that they replace, in part, because of the high cost of the reinforcements used in relatively strong molding compounds.

Reinforcements may have relatively high costs because of the use of synthetic fibers. In certain cases, synthetic fibers are costly because of their relatively high density and the significant amount of energy that may be expended during the formation of the synthetic fibers. For example, synthetic fibers are produced from purified raw materials into which significant energy may be expended during melting, forming, re-solidifying, applying binding agents, bundling, and applying primer to the fibers and bundles. Energy may also be expended by chopping these bundles into smaller fibers for use on molding compounds. Specialized and expensive equipment may be needed for these operations.

In light of the foregoing, what is needed is a method that provides molding compounds for molding operations forming articles that are sufficiently strong to substitute for existing articles while having economic advantages of relatively lower cost and/or weight.

SUMMARY OF THE INVENTION

One aspect of the present invention is a method for forming a molding compound. The method includes the steps of providing a non-synthetic reinforcement member and a synthetic member, simultaneously chopping the non-synthetic member and the synthetic member in a device for chopping, and forming a hybrid reinforcement member including a chopped non-synthetic reinforcement member and a chopped synthetic reinforcement member.

DETAILED DESCRIPTION OF THE EMBODIMENTS OF THE PRESENT INVENTION

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention. Practice within the numerical limits stated is generally preferred.

The description of a group or class of materials as suitable for a given purpose in connection with the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

In certain embodiments of the present invention, the use of non-synthetic fiber members in a reinforcement member may achieve cost reductions and relatively lower weight article without sacrificing decreasing the mechanical properties of the reinforcement member. A non-limiting example of a non-synthetic fiber member is a natural fiber.

Figure 1:
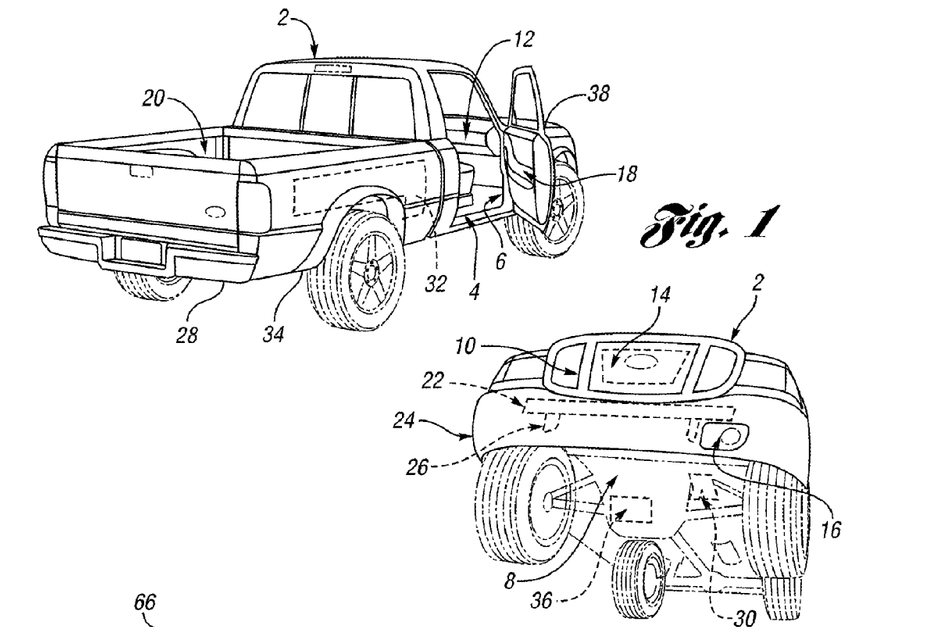
FIG. 1 shows the application of certain embodiments of the present invention on a vehicle.

Referring to FIG. 1, two views of a pick-up truck 2 are shown. The pick-up truck 2 may have lightweight or integrated parts, including, but are not limited to, parts having non-Class A surface quality, such as a vehicle door sill 4, a vehicle door opening ring 6, a motor undershield 8, a grille opening reinforcement 10, a vehicle instrument panel 12, an engine beauty cover 14, an HVAC duct 16, a vehicle interior door panel 18, a pickup vehicle cargo box inner liner 20, a fender 22, a fascia 24, a reinforcement bracket 26, back finish outer panel 28, vehicle heat shields 30, fuel tank shields 32, stone shields 34, oil pan cover 36, and engine valve cover 38.

Figure 2:
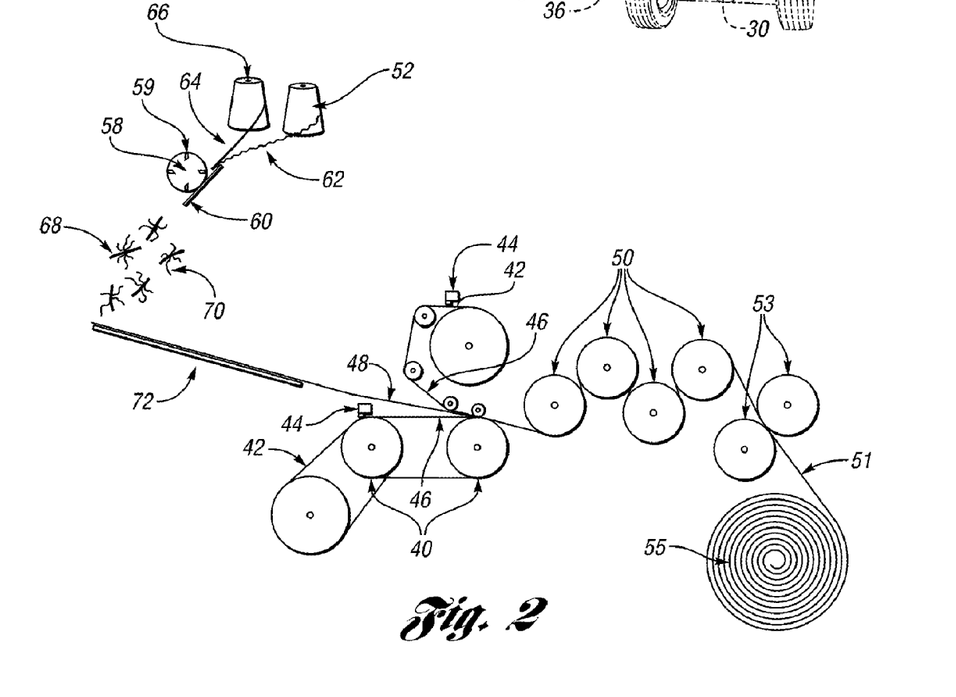
FIG. 2 shows certain embodiments of the present invention for forming a molding compound.

FIG. 2 show an embodiment for providing a reinforcement member 48 to a sheet molding compound (SMC) compounding line 40. Carrier film 42 is unrolled and passes beneath a doctor box 44 where thermoset paste 46 is applied. A hybrid reinforcement member 48 is provided continuously to the surface of thermoset paste 46. This embodiment has a non-synthetic reinforcement member that may be provided from a roll 52. The roll 52 may have been created off-line in a separate operation. A synthetic reinforcement member is provided from a second roll 66. The device for chopping 58 includes an anvil 60 and at least one carbide blade 59. Passing the non-synthetic reinforcement member 62 and the synthetic reinforcement member 64 through the device for chopping 58 may yield a chopped non-synthetic reinforcement member 68 and a chopped synthetic reinforcement member 70. A device for making an air laid mat 72 forms a hybrid reinforcement member 48 including chopped non-synthetic 68 and chopped synthetic reinforcement members 70. Compacting rollers 50 may apply either a kneading-shearing action when serpentine rollers are used or a uniform compacting pressure with spot pressure zones when a chain-belt is used. In a non-limiting example, nip rollers 53 apply a second pressure step, i.e., a localized compressive pressure to a sheet molding compound 51 after the compacting rollers 50. Relatively more pressure can be applied to the sheet molding compound 51 without causing a back up of resin when the nip rollers 53 are located after the serpentine and/or chain-belts. Without wishing to be tied to any particular theory, increasing compacting pressure to the sheet molding compound 51 may aid in increasing the extent of encapsulation of the fibers with the thermoset paste. Relatively increased encapsulation may result in improved mechanical properties of the molded article.

Figure 3:
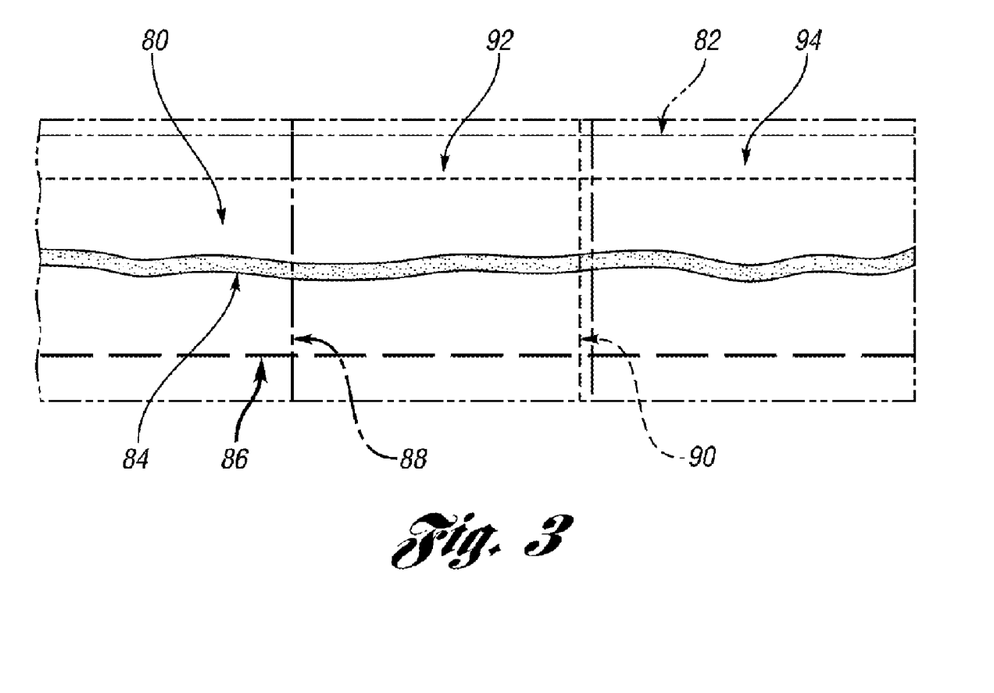
FIG. 3 shows certain embodiments of the present invention for forming a reinforcement member.

FIG. 3 shows an embodiment where a discrete hybrid mat 80 may be connected to a second discrete hybrid mat 92 using a tape 82 applied to the top of the mat. The tape could also be applied to the side or bottom. Mat 80 may also be connected to mat 92 using an adhesive bead 84 or a thread 86. Mat 80 may also be connected to mat 92 by an adhesive joint on butt ends 88. Mat 92 and mat 94 may be connected by an adhesive joint on a ship lap joint 90.

Figure 4:
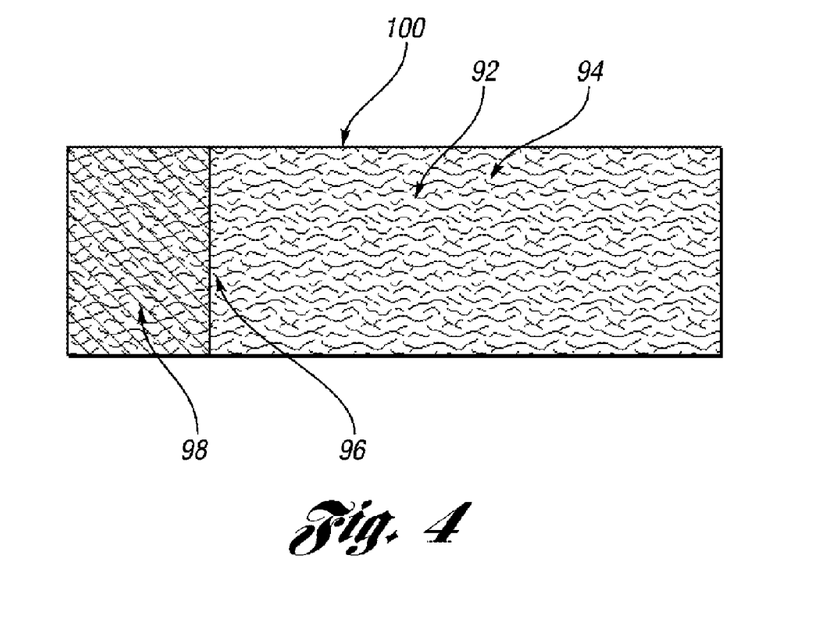
FIG. 4 shows certain embodiments of the present invention of a reinforcement member.

FIG. 4 shows an embodiment of a hybrid reinforcement member that is a substantially homogeneous hybrid mat 100 having chopped natural fibers 92 and chopped synthetic fibers 94 intermixed. While the mat 100 may or may not be bound or woven, it may be consolidated by being needled 96 or having an adhesive binder 98 which does not constitute a continuous matrix.

Figure 5:
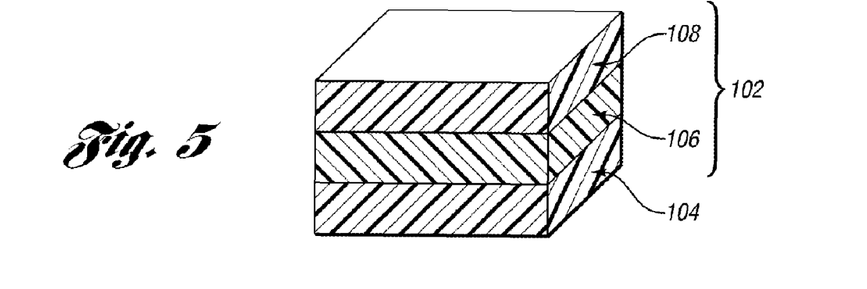
FIG. 5 shows a reinforcement member according to certain embodiments of the present invention.

FIG. 5 shows an embodiment of a hybrid reinforcement member that is a layered hybrid mat 102. The first layer 104 may be comprised of glass fiber. The second layer 106 may be comprised of one or more natural fibers. The third layer 108 may be comprised of glass fibers in a balanced composite. In an unbalanced composite, the third layer 108 may be comprised of other synthetic fibers. The selection of the composition of each layer depends upon the performance properties required of the hybrid part. For example, the first layer 104 could be comprised of one or more natural fibers, while the second layer 106 may be comprised of carbon fibers, and the third layer 108 may be comprised of one or more natural fibers. In addition, the layers may be comprised of mixed fibers. For example, the first layer 104 could be comprised of a natural fiber and a synthetic fiber.

Figure 6:
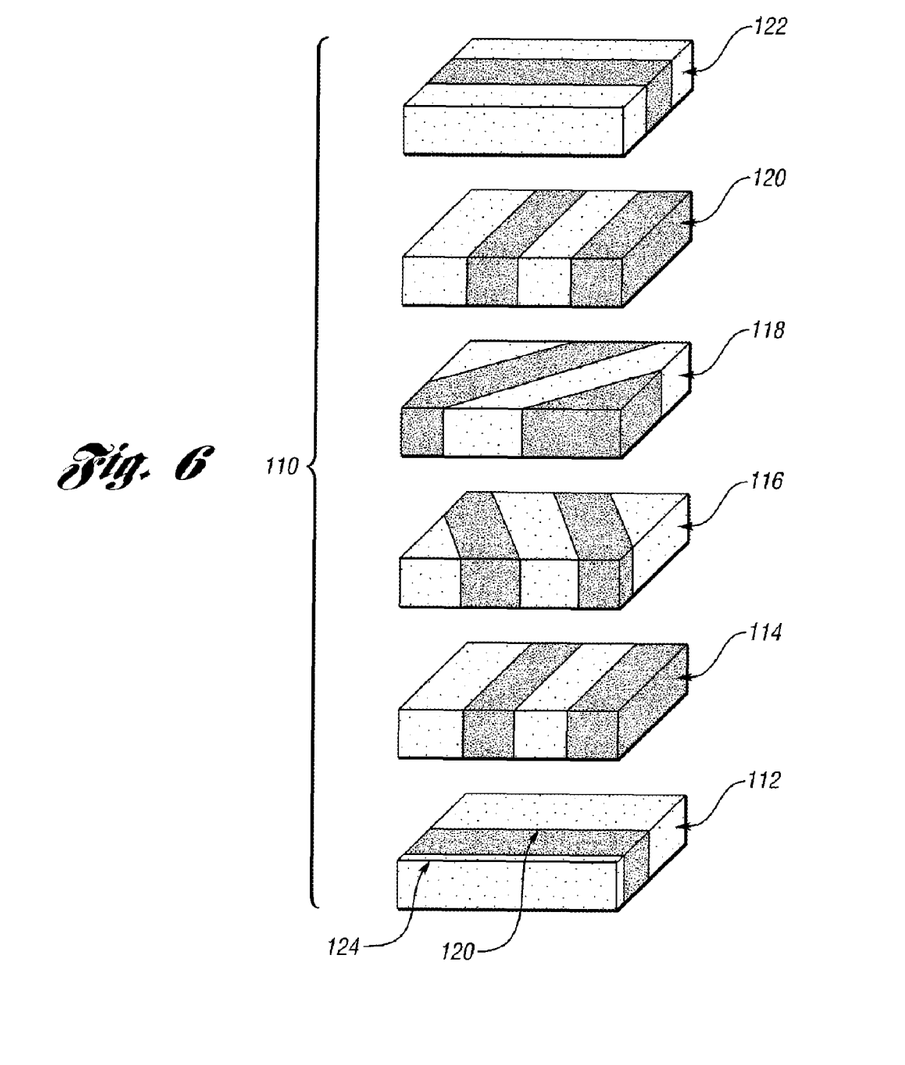
FIG. 6 shows a reinforcement member according to certain embodiments of the present invention.

FIG. 6 shows an embodiment of a hybrid reinforcement member that is a layered hybrid mat 110 that is designed to reinforce in an anisotropic manner. The first layer 112 may have stripes of alternating compositions. For example, the first stripe segment 124 may be comprised of natural fiber; while immediately adjacent the second stripe segment 126 may be comprised of glass fibers. In this embodiment, the stripes of the first layer 112 are shown as oriented in the process flow direction. The second layer 114 may have stripes of alternating compositions transverse to the process flow direction. The third layer 116 may have stripes of alternating composition positioned at a diagonal relative to the process flow direction. The angle of the diagonal may be selected so as to assist in reinforcing in the direction of maximum stress in the article when in service. In this embodiment, a balanced composite is formed by positioning the fourth layer 118 is a diagonal relative to the process flow direction; however it is perpendicular to the diagonal in the third layer 116. The fifth layer 120 is positioned with transverse stripes perpendicular to the process direction, while the sixth layer 122 is positioned with longitudinal stripes parallel to the process direction in order to complete the balanced composite.

Non-synthetic reinforcement members may include a number of types of reinforcements that are not predominately manmade, although they may have some input and processing by humans. Non-limiting examples may include silk, algal biomats, fermentation products, and natural fibers.

There are many types of natural fibers that can be used in accordance with the present invention. Natural fibers may be divided into wood and non-wood fibers. Categories of non-wood fibers may include bast fibers, core fibers, leaf fibers, straw fibers, seed fibers, fruit fibers, and grasses. Non-limiting examples of natural fibers include hemp, flax, ramie, jute, henequen, sisal mechanical, sisal ribbon, sisal xylem, straw, oil flax straw, wheat straw, wheat chaff, sugar beet fibers, banana leaf fiber, pineapple leaf fiber, bamboo, cotton, coir, water hyacinth, agricultural waste, corn straw, rice straw, microfibrillated cellulose, hemicellulose, Indian grass, elephant grass, blue stem grass, switch grass, grass, refined wood, kenaf core, kenaf bast, husks, rice husks, sealed fibers, and combinations thereof. Natural fibers may be comprised of fibrils, which can break off of the fibers during handling, wear, or natural breakage. Some natural fibers may be formed into larger structures such as twines, braids, ropes, cords, and/or bundles.

Natural fibers may have relatively strong mechanical properties such as a tensile strength greater than 50 megapascals (MPa), 200 MPa, 500 MPa, or 600 megapascals; and less than 2000 MPa, 1800 MPa, 1500 MPa, or 1000 megapascals. Other physical properties of natural fibers include, but are not limited to, a density of natural fibers that may be greater than 0.3 grams per cubic centimeter ($gm/cm^3$), 0.6 $gm/cm^3$, 0.75 $gm/cm^3$, or 0.90 grams; and less than 1.6 $gm/cm^3$, 1.55 $gm/cm^3$, 1.50 $gm/cm^3$, or 1.40 $gm/cm^3$ when measured using ASTM D 792.

Coating of an article after molding may retard the intrusion of water molecules into a fiber either in the form of water vapor or liquid water. Coatings may typically selected from those that form a moisture-resistant coating. Non-limiting examples include silicones, phenyl-formaldehyde, urea-formaldehyde, polyurethane, and/or polyvinylidenefluoride. The coating thickness and completeness should yield shapes with moisture absorption less than 2 weight percent per day (wt %/day), 1.5 wt %/day, 1.0 wt %/day, 0.50 wt %/day or 0.25 wt %/day when measured by method ISO 62.

Non-limiting examples of synthetic fibers include thermoplastics; polyester; aramid; fiberglass; carbon fiber; carbon nanotubes; electrically-conductive fibers; fibers generating piezoelectric energy, liquid crystal polymers, metals as soft or softer than 72 on the Vickers hardness scale, for example brass; thermosets, for example, polyester fiber; and combinations thereof. Synthetic fibers may be comprised of fibrils, which can break off of the fibers during handling, wear, or natural breakage. Some synthetic fibers may be formed into larger structures such as tapes, braids, tows, and/or bundles.

Synthetic fibers may have relatively stronger mechanical properties than natural fibers such as a tensile strength greater than 2000 megapascals (MPa), 2200 MPa, 2400 MPa, or 2600 MPa measured using ASTM D-638. The flexural modulus of synthetic fibers may be greater than 5 gigapascals (GPa), 10 GPa, 15 GPa, or 20 GPa when measured using method ASTM D 790. The density of synthetic fibers may be greater than 1.5 $gm/cm^3$, 1.6 $gm/cm^3$, 1.7 $gm/cm^3$, or 1.8 $gm/cm^3$ when measured using method ASTM D 792.

Rolls of synthetic or non-synthetic reinforcement members may be structured in many ways. Non-limiting examples may include separate rolls having only a single type of reinforcement member; a roll having at least two independent reinforcement members typically in separate strands; a roll having at least one blended strand comprising at least two reinforcement members, possibly in specifically designed varying proportions; or a roll having segments with different proportions of non-synthetic and synthetic reinforcement members. For example, it may be cost effective to have a series of roll prepared by a vendor having 10 volume % (vol %) non-synthetic fiber/90 vol % synthetic fiber, and the balance of the series increases the content incrementally with regards to the volume of non-synthetic fiber. This avoids the need for two or more devices for chopping, which may be precluded by capital availability or space, especially when retrofitting older production lines.

One device for chopping a non-synthetic reinforcement member and a synthetic reinforcement member simultaneously is available form Brenner International (Newark, Ohio) as custom model no. 1776.

A hybrid reinforcement member may be a hybrid reinforcement mat having portions of synthetic and non-synthetic fiber members. The positioning of various fiber members in the hybrid reinforcement member may enhance design opportunities to meet performance specifications. In non-limiting examples, in an embodiment a non-synthetic fiber member may be a natural fiber which, with a synthetic fiber member may be blended in a substantially homogeneous mixture. Such blends may offer design options in portions of articles where the mechanical properties are currently overengineered. In another embodiment a fiber may be oriented, possibly anisotropically. In a non-limiting example, fiber orientations having interspersing stripes of natural and synthetic fiber reinforcement members allow design options to put extra reinforcement strength in areas of the article that specifically need it. They may also provide multiple density interfaces for damping behavior to help enhance overall noise, vibration and harshness performance of articles.

In another embodiment, a hybrid reinforcement member may be a hybrid reinforcement mat having a structure that is a substantially homogeneous mixture of natural fibers and synthetic fiber members in one layer; a graded mixture of natural fiber member and synthetic fiber members in one or more layer; or a structure having two or more layers where each layer is either substantially a synthetic fiber member or a natural fiber member. These layers of fibers may have anisotropic orientation of the fibers. The orientation of the fibers may be varied between layers to amplify the performance characteristics of articles produced from the mat.

In one embodiment, anisotropic orientation may be achieved by laying down the fibers in alternating patterns of natural fibers and synthetic fibers. A non-limiting example where such anisotropy may be used is a fuel tank shield. These may be an optional vehicle part on specially-fitted law enforcement cars which may be more likely to be struck in the fuel tank during field service. While not wishing to be bound by a particular theory, having layers with varying orientation direction may distribute the impact force more efficiently than a single layer with one orientation of fiber. These multiple orientations may also compensate, in part, for the lesser mechanical performance of the molding compound where natural fiber is substituted for a portion of the synthetic fiber.

Hybrid reinforcement members having synthetic and natural fibers may be prepared by many different methods. Non-limiting examples of processes for forming hybrid reinforcement mats may include hydroentanglement, airlaid, programmable preform, woven mat, needled mat, non-woven mat, mat with binder, mat with adjuvant, chopped fiber, chopped fiber with binder, mats having tows, mats having tapes, mats having braids, and combinations thereof.

The proportion of the substitution of natural fiber for synthetic fiber may be varied according to the cost, mechanical, and chemical performance needs of the article. Natural fiber may be substituted for synthetic fiber at more than 1 weight percent (wt %), 5 wt %, 10 wt %, 15 wt %, 25 wt %, 35 wt %, 45 wt %, 55 wt %, 65 wt %, 75 weight percent; and less than 99 wt %, 95 wt %, 90 wt %, 85 wt %, 80 wt %, or 75 wt %. A calculation of the proportions may exclude any synthetic fiber connecting discrete hybrid reinforcement members.

In one embodiment of the present invention, adjuvants may be added to the continuous hybrid reinforcement mats to enhance performance. Non-limiting examples may include thermoplastics for low-profile improvement of the surface aesthetic qualities; nano-clay composites for stiffening; glass microspheres for volumizing the composite; sensors providing information to a vehicle controller; radio-frequency identification circuits for logistics; fibers generating piezoelectric energy, liquid crystal polymer fibers, or soft metal fiber strands, for example, metal having a hardness less than 72 Vickers hardness, for identifying counterfeit parts.

In another embodiment, binders may be used to unitize the mat. In addition, binders may also act as adjuvants, such as thermoplastic binders which may also serve as low-profile agents to make smoother surfaces.

In an embodiment of the present invention, a hybrid reinforcement member may be a continuously-fed continuous mat, for example a hybrid reinforcement mat, may be provided by in-line processes such as airlaid mats or programmable preforms.

In another embodiment, a hybrid reinforcement member may be a discrete mat or rolls of mats prepared in off-line processes may be connected together. The connection activity may occur prior to or immediately before providing of the continuous hybrid reinforcement mat between the thermoset paste layers. As a non-limiting example, discrete mats may be connected by placing mats immediately adjacent to one another, possibly on a carrier, adjoining the mats to one another by processes such as adhesively binding butt joints or shiplap joints; or having connecting pieces such as threads, tapes, films, veils, and/or adhesive beads.

In another embodiment, a hybrid reinforcement member may be formed from hybrid reinforcement mats by piecing together various structures, such as one or more tows, tapes, or braids. In non-limiting example, tows, tapes, or braids may be applied to mats in specific locations. These connecting pieces may have additional functions, for example, to amplify the performance characteristics of articles produced from the mat. In a non-limiting example, a carbon-fiber tape connecting two hybrid reinforcement mats may be placed so as to both act as a manufacturability aid by transporting medium along a guide feeding the mat between the thermoset pastes as well as provide a significant stiffening of the article in the narrow region where the fiber is integrated into the article during molding. A non-limiting example of an article using such a region may be a cantilevered arm used to position the balance of the article, for example, a vehicle fascia.

In another embodiment of the present invention, a hybrid reinforcement member may be a hybrid reinforcement mat formed by combining two mats having different reinforcement members. The combined sheets with first and second mats may be compacted in a first pressure step and a second pressure step. The second pressure step may be a localized compressive pressure. A non-limiting example of a generator of a localized compressive pressure may be a nip roller located after another type of compaction pressure. The resulting hybrid reinforcement mat may be viewed as a stack comprising: (a) first carrier film, (b) first sheet of thermoset paste, (c) first mat of natural and/or synthetic fiber members, (c) second mat of natural and/or synthetic fiber members, (d) second sheet of thermoset paste, and (e) second carrier film.

In this embodiment, a hybrid reinforcement member design may be prepared having sheets of SMC combined to offer the benefit of constructing mats using equipment available to most manufacturers with limited capital investment. In certain cases, such a hybrid reinforcement member design may be desirable when an article needs different performance characteristics on opposing faces or areas of the article. As a non-limiting example, ply charge patterns could be designed so that the article has a portion of a hybrid reinforcement member that is enriched in synthetic fibers in an area where fasteners will be located and has a portion of a hybrid reinforcement member that is relatively enriched in natural fibers in an area performing only a connecting function. In a non-limiting example, a vehicle heat shield may require enhanced performance only in areas where bolt holes focus stress. In this embodiment, those higher stress areas could be molded with molding compounds having a hybrid reinforcement member relatively enriched in synthetic fiber content and the balance of the vehicle heat shield molded with molding compounds having a hybrid reinforcement member relatively enriched in relatively lighter weight and lower cost natural fiber members.

In another embodiment of designing a hybrid reinforcement member with a thermoset paste, a hybrid reinforcement member containing an adjuvant, a non-limiting example may be a low profile additive, may have the adjuvant biased to a particular surface of the finished article to enhance the performance of that surface. In this non-limiting example, a low profile additive may perform by enhancing aesthetic appearance. This embodiment may reduce cost by minimizing a use of the relatively expensive performance-enhancing additive, in this example the low profile additive, in the bulk of the article where the additive's performance-enhancing properties may have reduced effect.

In another embodiment, a hybrid reinforcement member using anisotropic fiber orientation or asymmetrical materials distribution may represent an unbalanced composite. An article may have special design parameters to avoid issues of mismatched properties such as expansion and contraction with water uptake by the fibers. A non-limiting example of special design of a hybrid reinforcement member may be a design with graded transitions between a natural fiber member and a synthetic fiber member. This grading may mitigate sufficiently any mismatched properties.

In another embodiment, the thickness of the thermoset paste may be greater on one side relative the other. This would bias the location of the hybrid reinforcement member relative to center. This non-limiting example of an unbalanced composite may be desirable in a case where a pre-stressed or shaped article is desired. A motor undercover may be a non-limiting example where the effect of thermal expansion of the article is resisted by the shape of the article and the bias of the reinforcement member location.

In these and other embodiments, the structure of a hybrid reinforcement member and a thermoset paste described in embodiments of the present invention may be viewed as the structure of a hybrid reinforcement member and a thermoset paste before forming and molding operations. They may or may not necessarily represent a structure of a hybrid reinforcement member and a thermoset paste in a formed molding compound or a molded article. The continuous nature of a hybrid reinforcement member may be viewed as occurring during the manufacture of the molding compound.

Thermoset pastes may crosslink during a curing cycle. Articles manufactured from curable thermoset pastes have resins systems that may have become partially infusible. Examples of these resins may include, but are not limited to, a polyol, a polycarboxylic acid, a polyamine, a polyamide, an acetoacetate crosslinked with a polyisocyanate, a sheet molding compound, a bulk molding compound, a thick molding compound, a dough molding compound, a vinyl ester, an epoxy vinyl ester SMC, an unsaturated polyester SMC, a phenolic molding compound, and combinations thereof.

Articles formed for use in a transportation industry product often have specifications tailored to their required performance. Specifications for articles formed from molding compounds of the present invention include semi-structural properties, non-limiting examples of which are, a flexural modulus greater than 3 gigapascals (GPa), 4 GPa, 5 GPa, 6 GPa, or 7 GPa; a flexural strength greater than 40 megapascals (MPa), 45 MPa, 50 MPa, 75 MPa, or 100 MPa; and an Izod impact strength greater than 28 kilojoules per meter squared ($kJ/m^2$), 30 $kJ/m^2$, 40 $kJ/m^2$, 50 $kJ/m^2$, or 60 $kJ/m^2$; or other physical properties, for example, a density less than 1.96 grams per cubic centimeter ($gm/cm^3$), 1.80 $gm/cm^3$, 1.70 $gm/cm^3$, 1.60 $gm/cm^3$, or 1.50 $gm/cm^3$; and a water absorption less than 2 wt %, 1 wt %, 0.7 wt %, or 0.5 weight percent. A structural part may be viewed as a shape that meets the functional requirements required of it.

EXAMPLE 1

In this example, sheet molding compound is prepared with the hybrid reinforcement member of a natural fiber and a synthetic fiber. On the 24 inch wide laboratory-scale model 600 series SMC compounding line from Brenner International (Newark, Ohio), natural fibers and synthetic fibers are combined in a hybrid reinforcement mat reinforcement member between thermosetting pastes. Hemp mats are from Flexform Technologies (Elkhart, Ind.) and contain 15 weight percent polyester binder. The hemp mat overall density is 55 g per square foot. The hemp mats were needle punched and a density of 30 to 35 punches per square centimeter.

Chopped hemp is prepared by chopping unwaxed hemp twine having a construction of six twisted continuous fibers each fiber itself twisted which is supplied by Ecolution (Santa Cruz, Calif.). The chopped hemp length may be greater than 5 mm, 10 mm, 15 mm, 20 mm, 25 mm, or 30 mm and less than 100 mm.

All hemp mats and twine are oven dried at 80° C. for at least 12 hours prior to processing to eliminate moisture.

The synthetic fiber is an E-glass fiberglass. Chopped glass fibers are supplied by Vetrotex (Valley Forge, Pa.) and Ashland Specialty Chemical (Dublin, Ohio). The fibers are cut to a 1 inch length using a custom fiber chopper developed with Brenner International (Newark, Ohio). These are compounded continuously with the natural fibers being provided in a mat form which was fed continuously onto a thermoset paste layer from a large roll. The nominal fiber loadings were 40 to 45 weight percent for all of the SMC composite formulations.

The thermoset resins are AROTECH 2000, AROTECH 2002, and ENVIREZ 1807 supplied by Ashland Specialty Chemical Company, Dublin, Ohio. A typical composition of a thermoset paste is shown in Table 1.

TABLE 1

| Thermoset Paste Component | Parts-per-hundred resin |
|---|---|
| Resin | 80 |
| Polymerizable monomer | 20 |
| Cure catalyst | 1.5 |
| Cure inhibitor | 0.3 |
| Mold Release | 4.5 |
| B-side 59040 | 4.0 |
| Filler | 26 |

The polymerizable monomer is styrene monomer. The cross-linking catalyst is t-butylperoxybenzoate. The cure inhibitor is MOD E. Zinc stearate is the mold release. The filler is calcium carbonate. The B-side contains thickeners, resins, and adjuvants needed to react with the resin and other thermoset paste components. It is available through Ashland Specialty Chemical Company as product number 59040.

A first layer of thermoset paste is doctor bladed onto a carrier film. The fiber mats are provided atop the first layer of thermoset paste. A second layer of thermoset paste is doctor bladed onto a second film which is then applied to the top of the hybrid reinforcement mat. The carrier film-resin-fiber mat-resin-carrier film sandwich is compacted by rollers. A nip roller compaction step follows. The sheet exits the compounding line. This is sheet molding compound having a continuous hybrid reinforcement mat.

Sample charges of SMC made in this example are placed on a flat mold and compression molded at 150° C. and 667 kilonewtons of pressure. The results are given in Table 2.

The specifications for acceptance testing are Ford specifications WSS-M3D180-A1, WSS-M3D176-A3, WSS-M3D170-A2, WSS-M3D184-A and WSS-M3D185-A. The minimum tensile strength requirement is greater than 20 megapascals as measured using ISO R527 with the tensile tester run at 5 mm per minute. The test specimens are sectioned on a diamond blade band saw and milled using a high speed router. Fine filing is applied to the milled ends to reduce potential stress risers. The tests were performed on an Instron 3300 load frame with a 10 kilonewton load cell and 2 inch extensometers.

TABLE 2

| Thermoset paste | Fiber mat | Tensile Strength Specification Status |
|---|---|---|
| Arotech 2000 | Chopped Hemp | Fail |
| Arotech 2002 | Chopped Hemp | Fail |
| Envirez 1807 | Chopped Hemp | Fail |
| Arotech 2000 | Chopped glass | Pass |
| Arotech 2002 | Chopped glass | Pass |
| Envirez 1807 | Chopped glass | Pass |
| Arotech 2000 | Hybrid reinforcement mat of chopped glass and hemp | Pass |
| Arotech 2002 | Hybrid reinforcement mat of chopped glass and hemp | Pass |
| Envirez 1807 | Hybrid reinforcement mat of chopped glass and hemp | Pass |

EXAMPLE 2

Example 2 shows the performance of hybrid reinforcement members over a broader range of mechanical properties. The conditions are the same as in Example 1, except that only Arotech 2000 is used in formulating the thermoset paste.

The acceptance specifications for the mechanical properties of a vehicle noise shield are given in Ford specification WSS-M3D170-A2. The results are shown in Table 3.

The flexural tests are conducted on an Instron 3300 load frame with a 10 kN load cell and 40 mm span, using a 0.5 inch diameter load nose in three-localized compressive geometry. The specimens are cut from molded panels with a diamond blade band saw. The rough edges are wet polished on a grinding wheel with 320 grit polishing paper. The specimens are oven dried at 60° C. for 2 hours.

The notched Izod impact test is conducted on a TMI 43-02-03 Monitor/Impact instrument using a 10 lb pendulum. Notches are cut into the specimens using a TMI 22-05 notching cutter. The specimens are cut from molded panels by the same method as described for the flexural test specimens.

TABLE 3

| Fiber mat | Flexural modulus | Flexural strength | Izod Impact | Density g/cm³ |
|---|---|---|---|---|
| Chopped Hemp | Pass | Pass | Fail | 1.32 |
| Chopped Glass | Pass | Pass | Pass | 1.63 |
| Hybrid reinforcement mat of chopped glass and hemp | Pass | Pass | Pass | 1.42 |

EXAMPLE 3

In this example the coating with moisture-resistant coatings of the molded shapes containing natural fiber members is shown to improve the moisture uptake properties. The conditions are the same as in Example 2. In one sample, molded shape containing the hemp fiber is coated by spraying in BASF Dynaseal UV coating. The coating is 28 to 30 μm thick when dry.

The uptake of moisture by the samples is measured using method ISO 62. Certain specifications for vehicles indicate a water absorption specification maximum for molded shapes of 0.5 weight percent. The results are shown in Table 4.

TABLE 4

| Fiber mat | Water absorption |
|---|---|
| Chopped Hemp | Fail |
| Chopped Glass | Fail |
| Hybrid reinforcement mat of chopped glass and hemp | Fail |
| Hybrid reinforcement mat of chopped glass and hemp with Moisture-resistant Coating applied after molding | Pass |

EXAMPLE 4

This example shows the improvement that can be achieved by compacting the sheet molding compound having the hybrid reinforcement member. In this example, a hemp mat and glass mat hybrid reinforcement mat is processed with Arotech 2000 thermoset paste using the formula in Example 1. The compounded materials are allowed to maturate for 24 to 72 hours prior to molding. In one sample a nip roller is applied after standard kneading-compacting rolls. In the other sample, no nip roller is applied. The nip roller increases the compacting force by 100 pounds-force per square inch at the end of the processing line.

No significant change in tensile modulus is observed. However, an approximately 38% improvement in tensile strength is measured. This significant improvement in tensile strength may be attributed to better encapsulation of the fiber because of improved interfacial contact between the fiber and the cured thermoset paste.

EXAMPLE 5

This example shows the results of simultaneously chopping a hemp and glass fiber with a Brenner International Model 1776 device for chopping.

Three classes of sheet molding compound (SMC) sheets are prepared using a 40-45 wt % nominal fiber loading. The hemp fibers are oven dried at 80° C. for at least 12 hours in order to eliminate moisture. Hemp and hemp twine are chopped to 25 mm length and blended with several types of SMC resin. The SMC is allowed to maturate for 24-72 hours prior to molding. The compression molding occurs at 150° C. and 7 MPa of pressure. Included in one of the formulation are low profile additives to assist in making a Class A surface.

TABLE 5

| Reinforcement member | Average tensile modulus (GPa) |
| --- | --- |
| Chopped hemp | 6.5 |
| Chopped glass | 12 |
| Chopped glass and Chopped hemp hybrid reinforcement member, chopped simultaneously | 9.5 |

The simultaneously chopped glass and hemp hybrid reinforcement member yields a relatively intermediate tensile modulus when compared with the equivalent products made with the component reinforcement member materials. Therefore, the performance properties may be tailored to those of the desired article by varying the relative quantities of the component reinforcement members that comprise the hybrid reinforcement member.

EXAMPLE 6

This example shows additional mechanical properties relative to sheet molding compound prepared with only synthetic glass fiber.

Samples are prepared in vinyl ester SMC and polyester resins. The reinforcement members are glass fibers, hemp mat, hemp twine, and chopped hybrid, where the chopping of hemp twine and glass occurred simultaneously in a device for chopping.

TABLE 6

| Specific Property (glass fiber = 100%) | Chopped hybrid reinforcement member | Hemp twine | Hemp mat | Glass fiber |
| --- | --- | --- | --- | --- |
| Tensile Strength | 42% | 17% | 55% | 100% |
| Flexural Modulus | 93% | 55% | 122% | 100% |
| Flexural Strength | 77% | 39% | 74% | 100% |
| Izod Impact | 110% | 15% | 12% | 100% |

Taking into account the lower density of the hemp reinforcement member components, the chopped hybrid reinforcement member of this example performs nearly equivalently to conventional glass reinforced SMC for the properties described.

While the best mode for carrying out the invention has been described in detail, those familiar with the art to which this invention relates will recognize various alternative designs and embodiments for practicing the invention as defined by the following claims.

What is claimed is:

1. A method for forming a molding compound, the method comprising:
   (a) providing a non-synthetic and synthetic fiber material;
   (b) simultaneously chopping in a chopping device the non-synthetic and the synthetic fiber material to obtain a chopped mixture of a chopped non-synthetic and synthetic fiber material;
   (c) forming a hybrid reinforcement member having a first surface and an opposing second surface from the chopped mixture, the hybrid reinforcement member including the chopped non-synthetic and synthetic fiber material; and
   (d) subsequently applying a first thermoset paste, as a discrete layer, to at least a portion of the first surface of the hybrid reinforcement member;
   (e) curing the discrete layer of the first thermoset paste to form a cured thermoset paste; and
   (f) subsequent to step (e), compacting the hybrid reinforcement member to form the molding compound.

2. The method of claim 1, further comprising:
   (g) applying a second thermoset paste, as a discrete layer, to at least a portion of the opposing second surface of the hybrid reinforcement member.

3. The method of claim 2, further comprising:
   (h) applying a pressure to compact the hybrid reinforcement member.

4. The method of claim 2 further comprising arranging the hybrid reinforcement member as two or more discrete mats connected together prior to applying the first and second thermoset paste.

5. The method of claim 2, wherein one of the first and second thermoset pastes is applied at a thickness greater than the other of the first and second thermoset pastes.

6. The method of claim 1, wherein the hybrid reinforcement member is a hybrid reinforcement mat.

7. The method of claim 1, wherein the non-synthetic fiber material includes a natural fiber.

8. The method of claim 1, wherein the synthetic fiber material is adjacent the non-synthetic fiber material.

9. The method of claim 1, wherein the chopped non-synthetic fiber material includes at least 10% by volume of the hybrid reinforcement member.

10. The method of claim 1, wherein the first thermoset paste includes a vinyl ester compound.

11. The method of claim 1, further comprising molding the hybrid reinforcement member to obtain a molding compound.

12. The method of claim 11, further comprising the additional step of maturating the molding compound to obtain a maturated molding compound.

13. The method of claim 1 further comprising consolidating the hybrid reinforcement member with an adhesive binder to form a consolidated hybrid reinforcement member.

14. The method of claim 1 further comprising substantially drying the non-synthetic fiber material to reduce moisture.

15. The method of claim 1 further comprising simultaneously and continuously feeding the non-synthetic and synthetic fiber materials to the chopping device prior to the step of simultaneously chopping.

16. The method of claim 1, wherein the hybrid reinforcement member is a shaped sheet member.

17. The method of claim 1, further comprising applying a pressure to the molding compound to form an intermediate layer between the hybrid reinforcement member and the discrete paste layer, the intermediate layer including a portion of the chopped mixture of the chopped non-synthetic and synthetic fiber material and a portion of paste material from the paste layer.

18. A method for forming a molded article, comprising:
(a) providing a non-synthetic fiber material from a first roll;
(b) providing a synthetic fiber material from a second roll separate from the first roll;
(c) simultaneously chopping the non-synthetic and synthetic fiber material in a chopping device to obtain a chopped mixture of a chopped non-synthetic and synthetic fiber material;
(d) forming a hybrid reinforcement member having a first surface and an opposing second surface from the chopped mixture;
(e) subsequently applying a first thermoset paste, as a discrete layer, to the first surface of the hybrid reinforcement member to form a molding material;
(f) applying a pressure to the molding material; and
(g) molding the molding material to form a molded article.

19. The method of claim 18, further comprising applying a moisture-resistant coating to a portion of the molded article.

20. A method for forming a molded article, comprising:
(a) providing a non-synthetic fiber material from a first roll;
(b) providing a synthetic fiber material from a second roll separate from the first roll;
(c) simultaneously chopping the non-synthetic and synthetic fiber material in a chopping device to obtain a chopped mixture of a chopped non-synthetic and synthetic fiber material;
(d) forming a hybrid reinforcement member having a first surface and an opposing second surface from the chopped mixture;
(e) subsequently applying a first thermoset paste, as a discrete layer, to the first surface of the hybrid reinforcement member to form a molding material;
(f) applying a pressure to the molding material;
(g) molding the molding material to form a molded article; and
(h) applying a second thermoset paste, as a discrete layer, to at least a portion of the second surface of the hybrid reinforcement member.

* * * * *